United States Patent [19]

Nelson et al.

[11] Patent Number: 4,856,943

[45] Date of Patent: Aug. 15, 1989

[54] AIRFOIL INCIDENCE ANGLE ADJUSTMENT METHOD

[75] Inventors: Carl W. Nelson, Huntsville; Donald S. Smith, Arab; Frank P. Turner, Decatur, all of Ala.

[73] Assignee: United Technologies Corporation, Hartford, Conn.

[21] Appl. No.: 188,527

[22] Filed: Apr. 29, 1988

[51] Int. Cl.$^4$ .............................................. B23B 35/00
[52] U.S. Cl. ..................................... 408/1 R; 29/407; 29/445; 29/526.2; 244/123; 408/89
[58] Field of Search ...................... 29/407, 445, 526.1; 408/1 R, 89; 244/35, 47, 48, 45 R, 123

[56] References Cited

U.S. PATENT DOCUMENTS

| | | | |
|---|---|---|---|
| 2,991,668 | 7/1961 | Keller | 408/89 X |
| 3,170,691 | 2/1965 | Pritchard | 29/445 X |
| 3,254,399 | 6/1966 | Zahuramec | 29/407 |
| 3,430,317 | 3/1969 | Grimoldi et al. | 408/89 |
| 3,782,847 | 1/1974 | Kulzer | 408/89 X |
| 4,040,763 | 8/1977 | Assenmacher | 408/1 R |
| 4,086,017 | 4/1978 | Nessler | 408/89 |
| 4,228,976 | 10/1980 | Eiselbrecher | 244/123 |
| 4,445,264 | 5/1984 | Banerian | 29/445 |

Primary Examiner—Charlie T. Moon

[57] ABSTRACT

A method of providing interchangeability of aircraft wings, particularly providing a method of adjusting the angles of incidence and dihedral to compensate for differences in the twist angle between airfoils. The method comprises determining the angle of twist of an airfoil, having an airfoil attachment member, and supporting the airfoil on at least three supports spaced about said airfoil so that the airfoil attachment member is aligned with a hole boring means. The supports are adjusted so that the hole when bored through the airfoil attachment member provides the airfoil with angles of incidence and dihedral that substantially cancel the angle of twist. The hole is bored through the airfoil attachment member.

1 Claim, 2 Drawing Sheets

AIRFOIL INCIDENCE ANGLE ADJUSTMENT METHOD

DESCRIPTION

1. Technical Field

The field of art to which this invention pertains is methods of adjusting the incidence angles of airfoils.

2. Background Art

Nonaileron equipped wings flight characteristics are characterized by three wing position parameters. The three parameters are angles of specific incidence, twist and dihedral. Specific incidence is defined as the angle between the wing chordline and the line of flight at a chosen place on the wing. Dihedral is defined as the angle between the aircraft supporting surface and a horizontal transverse line. Twist is defined as the change in incidence angle along the length of a wing. Typically, it may be defined as the difference between two specific incidences (e.g., one close to the aircraft body and one close to the wing tip). FIG. 1 (a and b) illustrates the angles of dihedral, incidence and twist as identified by the numbers 60, 63 and 66, respectively.

These three angles are related through an equation that determines the aileron value. An aileron value approximating zero is desired as this results in level flight without any correction. Generally, in this equation, incidence is weighted more than twist and twist is weighted more than dihedral. Any difference between the right and left wing position parameters must be compensated for in order to obtain straight flight without aileron adjustment.

Generally the angle of twist is fixed when the wing skins are attached to a wing frame. Unfortunately, accuracy during the attachment of wing skins may be lower than desired. Thus, the angle of twist may vary from wing to wing. As a result, it is rare that wings could be interchanged on airframes and result in level flight without significant aileron adjustments. However, some aircraft have ailerons that cannot be adjusted enough in order to achieve level flight either because of flight requirements or mechanical limitations.

Thus, although interchangeable wing structures are desired, the present tolerance of manufacturing processes do not allow for wing interchangeability.

DISCLOSURE OF INVENTION

This invention is directed to a method of providing interchangeability of aircraft wings. More particularly, it is directed to a method of adjusting the angles of incidence and dihedral to compensate for differences in the twist angle between airfoils. The method comprises determining the angle of twist of an airfoil, having an airfoil attachment member, and supporting the airfoil on at least three supports spaced about said airfoil so that the airfoil attachment member is aligned with a hole boring means. The supports are adjusted so that the hole when bored through the airfoil attachment member provides the airfoil with angles of incidence and dihedral that substantially cancel the angle of twist. The hole is bored through the airfoil attachment member.

The foregoing and other features and advantages of the present invention will become more apparent from the following description and accompanying drawings.

BEST MODE FOR CARRYING OUT THE INVENTION

Figure 1A:
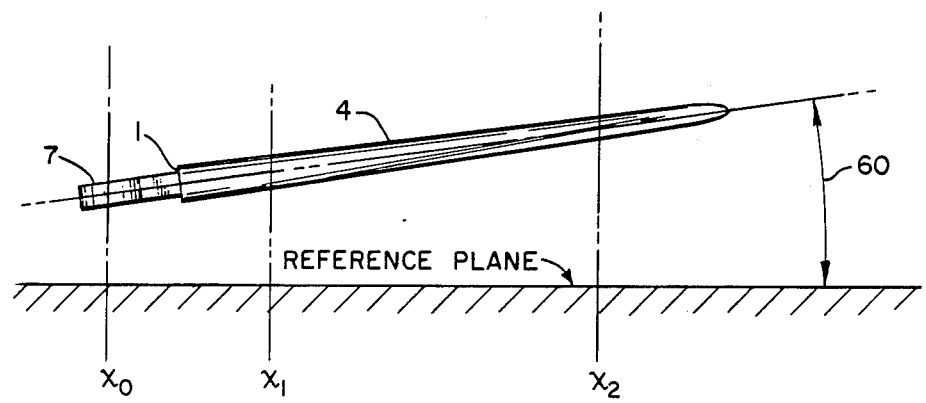
FIG. 1 (a and b) illustrates a perspective view of a wing structure showing the angles of incidence, dihedral and twist.
Figure 1B:
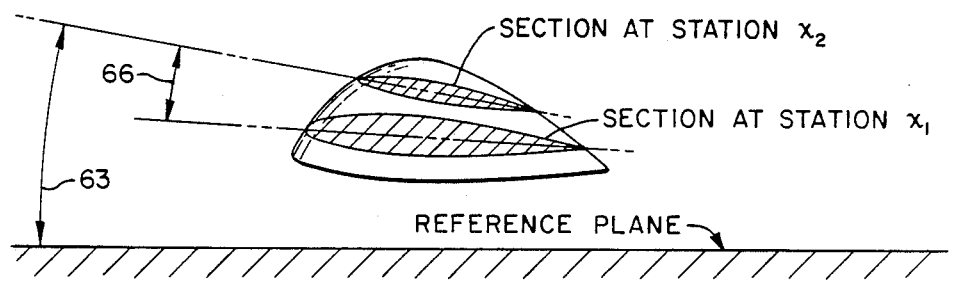

According to FIG. 1, the airfoil frame 1 is attached to the airfoil skin 4. An airfoil attachment member 7 extends from the airfoil frame 1 providing an eventual means of attachment to the aircraft. A platform 10 provides support structure for the hole boring operation. Three adjustable supports 13, 16, 19 are disposed on the platform. Typically, the supports may be moved in the plane of the platform to attain a desired configuration. Once in that configuration, the supports are secured to the platform 10. In addition, the supports have holding means 22 such as notches for holding the position (e.g., height) of the airfoil frame 1 during the hole boring operation. The height of the holding means 22 is adjustable (typically the leading edge support 13 is adjusted to effect the angle of incidence) so that the airfoil frame 1 may be positioned in the desired orientation. In addition, adjustable supports 25 may be used to provide additional support to the airfoil attachment member 7 during the boring operation. Hole boring means 28 such as a drill is aligned with the airfoil attachment member 7 so that a hole 34 may be bored through the member 7 in the desired location and angle. The airfoil attachment member 7 is thrubolted through hole 34 to the airframe.

Figure 2:
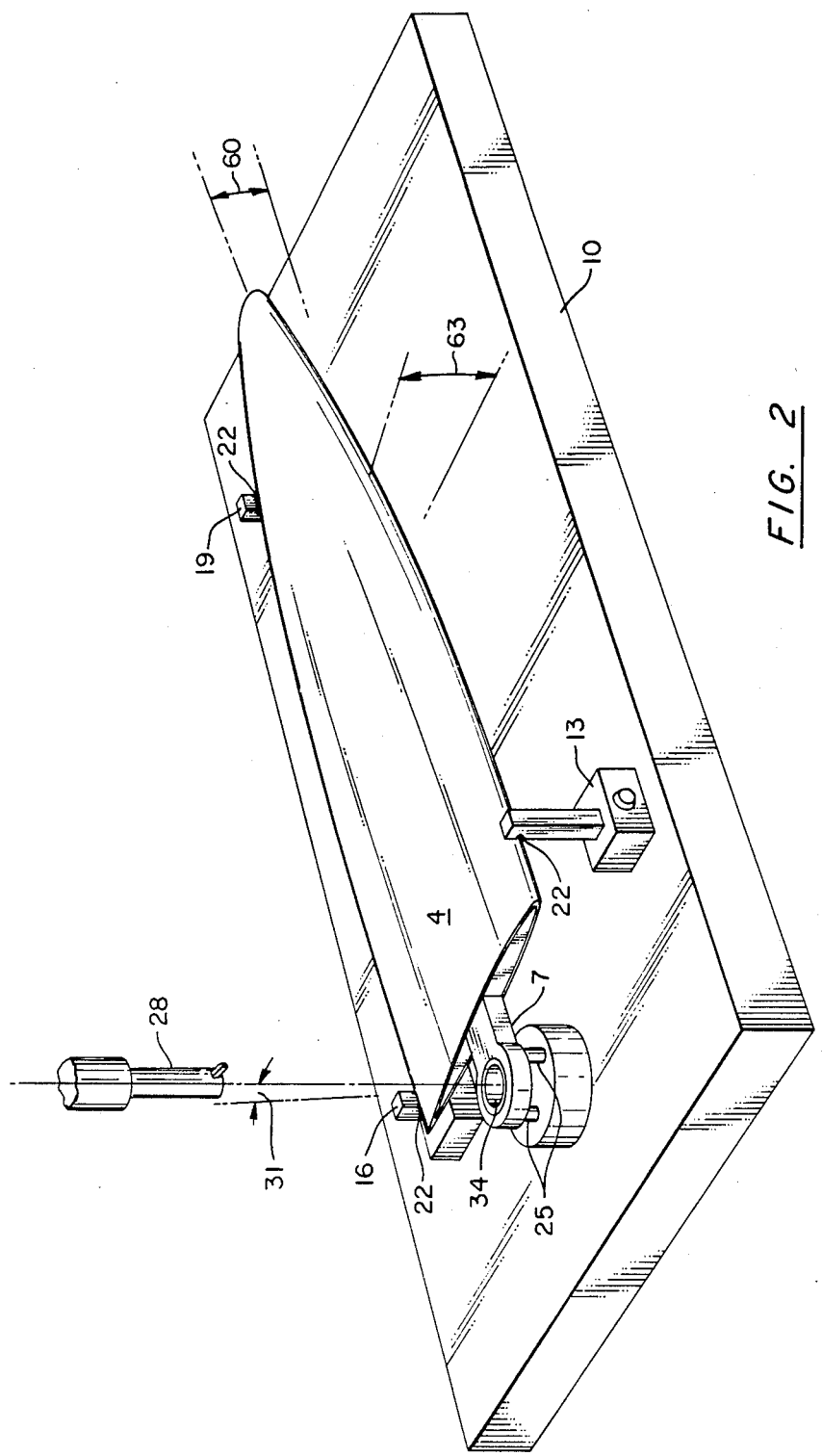
FIG. 2 illustrates a perspective view of an airfoil hole boring assembly with the hole boring method of the present invention.

Although the hole boring means 28 may be aligned with the desired location on the surface of the airfoil attachment member 7 the angle 31 that the hole actually cuts through the airfoil attachment member 7 is critical. The angle 31 is typically given with respect to the chord plane of the airfoil attachment member 7 and the airfoil frame 1. It is this angle 31 that determines the angles of dihedral and incidence for the airfoil. The adjusted elevation of the incidence angle is depicted in FIG. 2 by the number 63.

The angle 31 should be such that the resulting dihedral angle and angle of incidence substantially cancel the angle of twist. The angle of twist may be identified for each wing subsequent to manufacture but prior to determination and fixing of incidence and dihedral. By substantially cancel is meant a certain incidence angle can be determined, using the known twist data in an algorithm, that can cancel the effect of the twist in the aileron correction. The specific algorithm that relates incidence, twist, dihedral and aileron will vary from aircraft to aircraft and those skilled in the art will know how to calculate this for any specific aircraft and application. Alternatively stated, the configuration of the supports 13, 16 and 19 and the position of the holding means 22 are located in order that the hole 34 is bored at an angle 31 so that the angle of twist is compensated for by an adjustment, mainly in the angle of incidence.

Although this invention has been described in terms of boring a hole at an angle through a support member to correct for differences in twist, the same principles may be applied to wings that are attached by other means. For example, once the angle of twist is known, brackets used to attach the wing to the aircraft body may be adjusted to correct for differences in twist (e.g., by adjusting incidence).

Because any differences in the angle of twist between different wings (caused by uncontrollable differences in manufacturing) can be offset by controlling the angles of dihedral and incidence, airfoils can be produced that have common flight parameters. As a result, airfoils can be made that would have a common flight pattern. This provides interchangeability of airfoils on aircraft.

It should be understood that the invention is not limited to the particular embodiment shown and described herein, but that various changes and modifications may be made without departing from the spirit or scope of this concept as defined by the following claim.

We claim:

1. A method of boring a hole in an airfoil attachment member, said member connected to an airfoil, said hole used for attaching said airfoil to an aircraft, said airfoil having an angle of twist, comprising:
   (a) determining the angle of twist of said airfoil;
   (b) supporting said airfoil on at least three supports spaced about said airfoil so that said airfoil attachment member is aligned with a hole boring means;
   (c) adjusting said supports so that said hole when bored through the airfoil attachment member will provide the airfoil with angles of incidence and dihedral that substantially cancel the angle of twist; and
   (d) boring said hole through said airfoil attachment member.

* * * * *